United States Patent Office 3,438,944
Patented Apr. 15, 1969

3,438,944
ANTIMONY OXALATE AS A POLY-
CONDENSATION CATALYST
Mary J. Stewart, Riddlewood, Media, and John A. Price,
Swarthmore, Pa., assignors to FMC Corporation, Philadelphia, Pa., a corporation of Delaware
No Drawing. Filed Nov. 7, 1966, Ser. No. 592,252
Int. Cl. C08g 17/015
U.S. Cl. 260—75                    4 Claims

ABSTRACT OF THE DISCLOSURE

Process of preparing polyethylene terephthalate comprising carrying out an ester-interchange reaction between ethylene glycol and dimethyl terephthalate or carrying out a direct esterification reaction between ethylene glycol and terephthalic acid and polycondensing the reaction product thereof in the presence of antimony oxalate.

---

This invention relates to an improved method for the preparation of linear polyesters. More particularly, it relates to an improved polycondensation catalyst for use in the manufacture of highly polymeric linear polyesters.

It is known that linear polyesters can be prepared from a suitable ester of a dicarboxylic acid or a dicarboxylic acid by initially reacting such a material with a diol. When an ester of a dicarboxylic acid is used as a starting material, it is first reacted with a diol in the presence of a transesterification catalyst by means of an ester-interchange reaction; whereas, when a dicarboxylic acid is used as a starting material, it is first subjected to a direct esterification reaction with a diol in the presence of what is generally called a first stage catalytic additive or ether inhibitor. In either instance, the resulting reaction product which may be, in general, described as a polyester prepolymer, is then polycondensed in the presence of a polycondensation catalyst to form a polyester resin.

In the case of the transesterification method of preparing polyethylene wherein ethylene glycol is reacted with dimethyl terephthalate, the first stage product of the transesterification reaction is generally described as being comprised mainly of bis-2-hydroxyethyl trerphthalate. Whereas, the first stage reaction product of the direct esterification reaction between ethylene glycol and terephthalic acid is comprised of bis-2-hydroxyethyl terephthalate along with substantial quantities of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis-2-hydroxyethyl terephthalate or a polycondensation product thereof, wherein the D.P. (degree of polymerization) varies from about 2 to about 6. However, for purposes of simplicity in describing the present invention, hereinafter the terms "polyester prepolymer" and "bis-2-hydroxyethyl terephthalate" will both denote and include within their scope the product of the direct esterification reaction between terephthalic acid and ethylene glycol and the product of the transesterification reaction between dimethyl terephthalate and ethylene glycol as set forth above.

Heretofore, various materials have been suggested as polycondensation catalysts for polycondensing the polyester prepolymer products of both the transesterification method and direct esterification method of preparing polyester resins. However, in general, none of the substances that have been suggested as polycondensation catalysts heretofore have been completely satisfactory. For example, many of the polycondensation catalysts of the prior art only catalyze the condensation reaction to a low degree and they do not promote the reaction rate sufficiently to be acceptable for commercial purposes. Therefore, such polycondensation catalysts of the prior art do not act to form polyester products having carboxyl contents as low as required for some resin uses, or molecular weights and melting points as high as desired.

From a commercial standpoint, it is essential that a polyester resin be produced in the shortest possible time and the desired degree of polymerization be obtained. A polyethylene terephthalate resin suitable for melt spinning should have a carboxyl content value of about below 50 equivalents per million grams (eq./$10^6$ gr. or meq./kg.), a birefringent melting point of about at least 258–260° C., and an intrinsic viscosity preferably not less than about 0.60 (determined in a 60% phenol and 40% tetrachloroethane solution, wt./wt., at 30° C.), in order for the filaments formed therefrom to possess a satisfactory level of hydrolytic stability, thermal stability, ultra-violet light stability and a high degree of tenacity which is necessary for use of such filaments in the manufacture of fibers such as is used in wash and wear clothing.

It is an object of the present invention to prepare highly polymeric linear polyesters by a direct esterification reaction between a dicarboxylic acid and a diol or by a transesterification reaction between an ester of a dicarboxylic acid and a diol, so as to form a polyester prepolymer and the polycondensation of the said polyester prepolymer in the presence of an improved polycondensation catalyst.

It is another object of the present invention to prepare a highly polymeric linear polyester resin by polycondensing bis-2-hydroxyethyl terephthalate in the presence of an improved polycondensation catalyst.

These and other objects are accomplished in accordance with the present invention which involves a method for preparing highly polymeric linear polyesters wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the improvement comprising carrying out the polycondensation of the polyester prepolymer in the presence of a catalytic amount of antimony oxalate.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.5:1 to about 2.6:1. The transesterification reaction is generally carried out at atmospheric pressure in an inert atmosphere such as nitrogen, initially at a temperature range of from about 125° C. to about 250° C. but preferably between about 150° C. and 200° C. in the presence of a transesterification catalyst. During the first stage of this reaction, methyl alcohol is evolved and is continuously removed by distillation. After a reaction period of about 1 to 2 hours, the temperature of the reaction mixture is raised to from about 200° C. to about 300° C. for approximately one to three hours in order to complete the reaction so as to form the desired polyester prepolymer and distill off any excess glycol which has been produced.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similarly, the preparation of polyester resins via the direct esterification reaction is generally carried out with a molar ratio of glycol, such as ethylene glycol, to a dicarboxylic acid, such as terephthalic acid, of from about 1:1 to about 15:1, but preferably about 1.5:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate may be used. The first stage catalytic additives are generally used in concentrations ranging from $5 \times 10^{-5}$ mole to about $5 \times 10^{-2}$ mole of catalytic additive per mole of terephthalic acid present in the initial terephthalic acid-glycol reaction mixture.

The polycondensation step of the present invention is accomplished by adding antimony oxalate to a polyester prepolymer or bis-2-hydroxyethyl terephthalate and heating the blend thereof under reduced pressure within the range of from about 0.05 mm. to 20 mm. of mercury while being agitated at a temperature of from about 260° C. to about 325° C. for from two to four hours. In accordance with the present invention, antimony oxalate is generally employed in amounts ranging from about 0.01% to about 0.2%, based on the weight of the polyester prepolymer to be polycondensed. Usually, it has been found that from about 0.02% to about 0.1% of the subject polycondensation catalyst is preferred in most instances. Higher or lower concentrations of antimony oxalate can also be used in the subject polycondensation reaction. However, when concentrations less than the above are used, its effectiveness is generally reduced, whereas if concentrations greater than this are used, no further improvement in the present method or desired product is generally obtained.

The following examples of several preferred embodiments of the present invention will further serve to illustrate the present invention. All parts are by weight unless otherwise indicated.

EXAMPLE I

A blended mixture comprising 474 g. of terephthalic acid, 288 ml. of ethylene glycol and 149 ml. of triethylamine was charged into a reaction vessel equipped with a nitrogen inlet, a Dean-Stark separating apparatus, heating means, and stirring means. The reaction mixture was agitated and the temperature was raised to about 197° C. under a nitrogen blanket at atmospheric pressure. At about 190° C. a water-triethylamine azeotropic mixture started to distill off. The azeotropic mixture was continuously separated by means of the Dean-Stark apparatus, and the triethylamine recovered was continuously returned to the reaction vessel. The reaction mixture became almost clear. Then the temperature was allowed to rise to about 220° C. over a one hour period to form a polyester prepolymer. The prepolymer product was allowed to cool under an atmosphere of nitrogen.

EXAMPLE II

Fifty grams of the prepolymer product of Example I was mixed with 0.02 g. of antimony oxalate and placed in a reaction vessel. The reaction mixture was heated at about 280° C. under reduced pressure of from about 0.05 to about 0.1 mm. of mercury while under agitation for about two hours to bring about the polycondensation of the prepolymer of Example I and formation of a polyester resin. The polyester resin formed had an intrinsic viscosity of 0.72, a carboxyl content value of 17.0 (meq./kg.) and a melting point of about 265° C.

EXAMPLE III

A mixture comprising 600 g. of dimethyl terephthalate, 396 g. of ethylene glycol, and 0.24 g. of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE IV

Fifty grams of the prepolymer product of Example III was mixed with 0.02 g. of antimony oxalate and placed in a reaction vessel. The reaction mix was heated at about 280° C. under reduced pressure of from about 0.05 to about 0.1 mm. of mercury while under agitation for about three hours to bring about the polycondensation of the polyester prepolymer product of Example III and formation of a polyester resin. The polyester resin formed had an intrinsic viscosity of 0.86, a carboxyl content value of 10.2 (meq./kg.) and a melting point of about 264° C.

The intrinsic viscosity of the polyester resin products of the above examples were measured in a 60% phenol and 40% tetrachloroethane solution (wt./wt.) at 30° C.

The process of the present invention has been described with particular reference to polyethylene terephthalate, but it will be obvious that the subject invention includes within its scope other polymeric polymethylene terephthalates formed from glycols of the series $HO(CH_2)_nOH$, where $n$ is 2 to 10 and terephthalic acid and copolyesters containing varied amounts of other suitable dicarboxylic acids such as isophthalic acid.

The results obtained in the above examples, in general, indicate that antimony oxalate when used as a polycondensation catalyst, facilitates the preparation of and enhances the properties of the resulting polyester resin products. Through the use of antimony oxalate the polycondensation of the polyester prepolymers in the above examples proceeded at a rapid rate. Further, the polyester resins produced are characterized by low carboxyl content values, desirably high intrinsic viscosities and high melting points.

We claim:
1. A process of preparing a highly polymeric linear polyester which comprises polycondensing bis-2-hydroxyethyl terepthhalate in the presence of a catalytic amount of antimony oxalate as a polycondensation catalyst.
2. The process of claim 1 wherein the antimony oxalate is present in an amount of from about 0.01% to about 0.2%, based on the weight of bis-2-hydroxyethyl terephthalate.
3. In a process of preparing polyethylene terephthalate wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the im- provement comprising carrying out the polycondensation of the polyester prepolymer in the presence of a catalytic amount of antimony oxalate as a polycondensation catalyst.

4. The process of claim 3 wherein the antimony oxalate is present in an amount of from about 0.01% to about 0.2%, based on the weight of polyester prepolymer.

References Cited

UNITED STATES PATENTS 2,850,483  9/1958  Ballentine _____ 260—75

FOREIGN PATENTS 740,381  11/1955  Great Britain.
795,968   6/1968  Great Britain.

OTHER REFERENCES

Lange: Handbook of Chemistry, 7th ed., 1949, Handbook Publishers Inc.

WILLIAM H. SHORT, *Primary Examiner.*

LOUISE P. QUAST, *Assistant Examiner.*

Disclaimer 3,438,944.—*Mary J. Stewart*, Riddlewood, Media, and *John A. Price*, Swarthmore, Pa. ANTIMONY OXALATE AS A POLYCONDENSATION CATALYST. Patent dated Apr. 15, 1969. Disclaimer filed Oct. 4, 1972, by the assignee, *FMC Corporation*.

Hereby enters this disclaimer to claims 1 through 4 of said patent.

[*Official Gazette July 10, 1973.*]